United States Patent
Oh et al.

(10) Patent No.: US 11,192,429 B2
(45) Date of Patent: Dec. 7, 2021

(54) THERMAL MANAGEMENT SYSTEM FOR VEHICLE

(71) Applicants: HYUNDAI MOTOR COMPANY, Seoul (KR); KIA MOTORS CORPORATION, Seoul (KR); Hanon Systems, Daejeon (KR)

(72) Inventors: Man Ju Oh, Yongin-si (KR); Sang Shin Lee, Suwon-si (KR); Jae Woong Kim, Hwaseong-si (KR); So La Chung, Seoul (KR); Yun Sub Chung, Daejeon (KR); Gum Bae Choi, Daejeon (KR)

(73) Assignees: HYUNDAI MOTOR COMPANY, Seoul (KR); KIA MOTORS CORPORATION, Seoul (KR); HANON SYSTEMS, Daejeon (KR)

( * ) Notice: Subject to any disclaimer, the term of this patent is extended or adjusted under 35 U.S.C. 154(b) by 128 days.

(21) Appl. No.: 16/567,593

(22) Filed: Sep. 11, 2019

(65) Prior Publication Data
US 2020/0346523 A1    Nov. 5, 2020

(30) Foreign Application Priority Data
Apr. 30, 2019    (KR) .................. 10-2019-0050278

(51) Int. Cl.
| B60H 1/32 | (2006.01) |
| B60H 1/00 | (2006.01) |
| B60L 58/26 | (2019.01) |
| B60H 1/22 | (2006.01) |

(52) U.S. Cl.
CPC ....... B60H 1/3228 (2019.05); B60H 1/00278 (2013.01); B60H 1/00485 (2013.01); B60H 1/22 (2013.01); B60L 58/26 (2019.02)

(58) Field of Classification Search
CPC .............. B60H 1/3228; B60H 1/00278; B60H 1/00485; B60H 1/22; B60L 58/26
See application file for complete search history.

(56) References Cited

U.S. PATENT DOCUMENTS

| 5,549,153 | A | 8/1996 | Baruschke et al. |
| 8,215,432 | B2 | 7/2012 | Nemesh et al. |
| 8,336,319 | B2 | 12/2012 | Johnston et al. |
| 8,402,776 | B2 | 3/2013 | Johnston et al. |
| 2013/0284415 | A1 | 10/2013 | Katoh |
| 2014/0041826 | A1 | 2/2014 | Takeuchi et al. |

(Continued)

FOREIGN PATENT DOCUMENTS

| DE | 102007063251 A1 | 7/2009 |
| DE | 102012010697 A1 | 12/2013 |

(Continued)

OTHER PUBLICATIONS

U.S. Non-Final Office Action dated Nov. 4, 2019 issued in U.S. Appl. No. 15/943,761.

(Continued)

*Primary Examiner* — Marc E Norman
(74) *Attorney, Agent, or Firm* — Morgan, Lewis & Bockius LLP

(57) ABSTRACT

A thermal management system for a vehicle can efficiently manage energy required for interior air-conditioning and cooling/heating of a battery in the automotive thermal management field.

15 Claims, 12 Drawing Sheets

(56) References Cited

U.S. PATENT DOCUMENTS

| | | |
|---|---|---|
| 2015/0258875 A1 | 9/2015 | Enomoto et al. |
| 2016/0107506 A1 | 4/2016 | Johnston |
| 2016/0339767 A1 | 11/2016 | Enomoto et al. |
| 2019/0168578 A1* | 6/2019 | Kim .................. B60H 1/323 |
| 2019/0176571 A1* | 6/2019 | Oh .................. B60H 1/00899 |
| 2019/0308491 A1* | 10/2019 | Lee .................. B60H 1/00278 |
| 2020/0346523 A1 | 11/2020 | Oh et al. |
| 2020/0353796 A1* | 11/2020 | Oh .................. B60H 1/00278 |
| 2021/0016625 A1 | 1/2021 | Lee et al. |

FOREIGN PATENT DOCUMENTS

| | | |
|---|---|---|
| DE | 102014111971 A1 | 2/2016 |
| DE | 112014005360 T5 | 8/2016 |
| JP | 2019-031109 A | 2/2019 |
| KR | 10-1448656 B1 | 10/2014 |
| KR | 10-1787503 B1 | 10/2017 |
| KR | 10-2018-0093184 A | 8/2018 |
| KR | 10-2019-0033115 A | 3/2019 |
| KR | 10-2019-0127219 A | 11/2019 |

OTHER PUBLICATIONS

German Office Action dated Apr. 20, 2021 issued in German Patent Application No. 102018108317.3 (with English translation).
U.S. Office Action dated Apr. 16, 2021 issued in U.S. Appl. No. 16/653,432.
U S. Office Action dated Aug. 6, 2021, issued in corresponding U.S. Appl. No. 16/653,239.

* cited by examiner

THERMAL MANAGEMENT SYSTEM FOR VEHICLE

CROSS-REFERENCE TO RELATED APPLICATION

This application claims the benefit of priority to Korean Patent Application No. 10-2019-0050278, filed on Apr. 30, 2019 in the Korean Intellectual Property Office, the disclosure of which is incorporated herein by reference.

TECHNICAL FIELD

The present disclosure relates to a thermal management system for a vehicle, the system efficiently managing energy required for interior air-conditioning and cooling/heating of a battery in the automotive thermal management field.

BACKGROUND

Recently, implementation of an eco-friendly technology and solution of problems such as energy exhaustion are arising as social issues associated with an electric vehicle. An electric vehicle is driven by a motor that outputs power by being supplied with electricity from a battery. Accordingly, an electric vehicle has advantages of not discharging carbon dioxide, generating little noise, and having a higher energy efficiency of a motor than the energy efficiency of an engine, so it has been spotlighted as an eco-friendly vehicle.

The core technology of such an electric vehicle is the technology related to a battery module, and recently, studies for reducing the weight and size of a battery and decreasing charging time have been actively conducted. A battery module can maintain optimal performance and a long lifespan when it is used in an optimal temperature environment. However, it is substantially difficult to use a battery module in an optimal temperature environment due to heat generated in operation of the battery module and a change of external temperature.

Further, an electric vehicle has no waste heat source generated by combustion in a specific engine such as an internal combustion engine, so the interior of the electric vehicle is heated with an electric heating device in wintertime. Further, a warming-up of a battery is required to improve the charge/discharge performance of the battery in an intense cold period, so a separate heating-type electric heater is used. That is, a technology of operating a heating/cooling system for controlling the temperature of a battery module separately from a heating/cooling system for interior air-conditioning in order to maintain an optimal temperature environment for the battery module has been adopted. In other words, two independently heating/cooling systems are constructed, and one of them is used for interior heating/cooling and the other one is used for controlling the temperature of a battery module.

However, since such an operation method cannot efficiently manage energy, the traveling range may become shorter, and long-distance driving may not be possible. Further, the traveling range decreases over 30% when cooling is performed in summer time and over 40% when heating is performed in wintertime, so heating in wintertime that may not be a problem in an internal combustion engine may become problematic. When a high-capacity PTC is mounted to solve the problem with heating in wintertime, there may be problems of reduction of the traveling range and excessive manufacturing cost and weight due to use of heat pump.

The description provided above as a related art of the present disclosure is just for helping understanding the background of the present disclosure and should not be construed as being included in the related art known by those skilled in the art.

SUMMARY

The present disclosure has been made in an effort to solve this problem and an aspect of the present disclosure is to provide a thermal management system for a vehicle, the system efficiently managing energy required for interior air-conditioning and cooling/heating of a battery in the automotive thermal management field.

A thermal management system for a vehicle according to one aspect of the present disclosure may include: a battery line, through which cooling water flows, having a first pump and connecting a first radiator and a high-voltage battery core to each other for exchanging heat therebetween; a refrigerant line, through which a refrigerant circulates, having a compressor, an expansion valve, a condenser, and an evaporator; an interior cooling line, through which cooling water flows, having a second pump and connecting an interior air-conditioning cooling core with a first heat exchanger to exchange heat with the evaporator; an interior heating line, through which cooling water flows, having a third pump and connecting an interior air-conditioning heating core with a second heat exchanger to exchange heat with the condenser; a first battery cooling line diverging from a downstream side of the cooling core of the interior cooling line, connected to an upstream side of the high-voltage battery core of the battery line, and having a cooling control valve controlling whether to allow cooling water, which has passed through the cooling core, to flow into the high-voltage battery core; and a first battery heating line diverging from a downstream side of the heating core of the interior heating line, connected to an upstream side of the high-voltage battery core of the battery line, and having a heating control valve controlling whether to allow cooling water, which has passed through the heating core, to flow into the high-voltage battery core.

The thermal management system may further include a second battery cooling line, a second battery heating line and a first valve. The second battery cooling line and the second battery heating line may be respectively diverging from a downstream side of the high-voltage battery core of the battery line. One end of the second battery cooling line may be connected to an upstream side of the first heat exchanger of the interior cooling line. Another end of the second battery heating line may be connected to an upstream side of the second heat exchanger of the interior heating line. The first battery cooling line and the first battery heating line may be connected to the battery line through the first valve.

The thermal management system may further include: a second radiator line connecting the second radiator and the second heat exchanger to each other for exchanging heat; and a second valve. One end of the second radiator line may be connected to an upstream side of the second heat exchanger of the interior heating line. Another end of the second radiator line may be connected to a downstream side of the second heat exchanger of the interior heating line. The second radiator line and the second battery heating line may be connected to the interior heating line through the second valve.

In a first mode that cools the high-voltage battery core and discharges cooled air to the interior of a vehicle, the controller may be configured to circulate the refrigerant in the refrigerant line by operating the compressor, circulate cooling water by controlling the third pump and the second valve such that the second radiator and the second heat exchanger exchange heat with each other, and control the cooling water that has passed through the cooling core to flow into the high-voltage battery core and then flow into the first heat exchanger by controlling the second pump, the cooling control valve, and the first valve.

In a second mode that discharges cooled air to the interior of a vehicle, the controller may be configured to circulate the refrigerant in the refrigerant line by operating the compressor, circulate cooling water by controlling the third pump and the second valve such that the second radiator and the second heat exchanger exchange heat with each other, and control the cooling water that has passed through the cooling core to flow into the first heat exchanger by controlling the second pump and the cooling control valve.

The thermal management system may further include: a third radiator line connecting a third radiator and the first heat exchanger for heat exchange; and a third valve. One end of the third radiator line may be connected to an upstream side of the first heat exchanger of the interior cooling line. Another end of the third radiator may be connected to a downstream side of the first heat exchanger of the interior cooling line. The third radiator line and the second battery cooling line may be connected to the interior cooling line through the third valve.

In a third mode that increases the temperature of the high-voltage battery core and discharges air with increased temperature to the interior of a vehicle, the controller may be configured to circulate the refrigerant in the refrigerant line by operating the compressor, circulate cooling water by controlling the second pump and the third valve such that the third radiator and the first heat exchanger exchange heat with each other, and control the cooling water that has passed through the heating core to flow into the high-voltage battery core and then flow into the second heat exchanger by controlling the third pump, the heating control valve, the first valve, and the second valve.

In a fourth mode that discharges air with increased temperature to the interior of a vehicle, the controller may be configured to circulate the refrigerant in the refrigerant line by operating the compressor, circulate cooling water by controlling the second pump and the third valve such that the third radiator and the second heat exchanger exchange heat with each other, and control the cooling water that has passed through the heating core to flow into the second heat exchanger by controlling the third pump, the heating control valve, and the second valve.

The thermal management system may further include an electric device line connected with an electric device core, having one end connected to an upstream side of the third radiator of the third radiator line, having the other end connected to a downstream side of the third radiator of the third radiator line through a fourth valve, having a fourth pump, and having cooling water flowing therethrough.

The thermal management system may further include: an electric device line connected with an electric device core; and a fourth valve. The electric device line may have one end connected to an upstream side of the third radiator of the third radiator line and another end connected to a downstream side of the third radiator of the third radiator line through the fourth valve. The electric device line may have a fourth pump through which cooling water flows.

In a fifth mode that recovers waste heat of the electric device core, increases the temperature of the high-voltage battery core, and discharges air with increased temperature to the interior of a vehicle, the controller may be configured to circulate the refrigerant in the refrigerant line by operating the compressor, circulate cooling water by controlling the second pump, the third valve, and the fourth valve such that the electric device core and the first heat exchanger exchange heat with each other, and control the cooling water that has passed through the heating core to flow into the high-voltage battery core and then flow into the second heat exchanger by controlling the third pump, the heating control valve, the first valve, and the second valve.

In a sixth mode that recovers waste heat of the electric device core and discharges air with increased temperature to the interior of a vehicle, the controller may be configured to circulate the refrigerant in the refrigerant line by operating the compressor, circulate cooling water by controlling the fourth pump, the third valve, and the fourth valve such that the electric device core and the first heat exchanger exchange heat with each other, and control the cooling water that has passed through the heating core to flow into the second heat exchanger by controlling the third pump, the heating control valve, and the second valve.

In a seventh mode that discharged dehumidified air to the interior of a vehicle, the controller may be configured to circulate the refrigerant in the refrigerant line by operating the compressor, circulate cooling water such that the cooling water that has passed through the second heat exchanger to diverge and separately flow into the heating core and the second radiator by controlling the third pump, the heating control valve, and the second valve, and control the cooling water that has passed through the cooling core to flow into the second heat exchanger by controlling the second pump, the cooling control valve, and the third valve.

In an eighth mode that cools the electric device core using the third radiator, the controller may be configured to control the cooling water that has passed through the electric device core to flow into the third radiator by controlling the fourth pump and the fourth valve.

In a ninth mode that cools the high-voltage battery core using the first radiator, the controller may be configured to control the cooling water that has passed through the high-voltage battery core to flow into the first radiator by controlling the first pump and the first valve.

In a tenth mode that cools the high-voltage battery core using the first radiator and cools the electric device core using the third radiator, the controller may be configured to control the cooling water that has passed through the high-voltage battery core to flow into the first radiator by controlling the first pump and the first valve, and control the cooling water that has passed through the electric device core to flow into the third radiator by controlling the fourth pump and the fourth valve.

In an eleventh mode that cools the electric device core using the third radiator and discharges air with increased temperature to the interior of a vehicle, the controller may be configured to circulate the refrigerant in the refrigerant line by operating the compressor, control the cooling water that has passed through the second heat exchanger to diverge and separately flow into the third radiator and the electric device core by controlling the second pump, the third valve, and the fourth valve, and control the cooling water that has passed through the heating core to flow into the second heat exchanger by controlling the third pump, the heating control valve, and the second valve.

According to the thermal management system for a vehicle of the present disclosure, it is possible to efficiently manage energy required for interior air-conditioning and cooling/heating of a battery in the automotive thermal management field.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
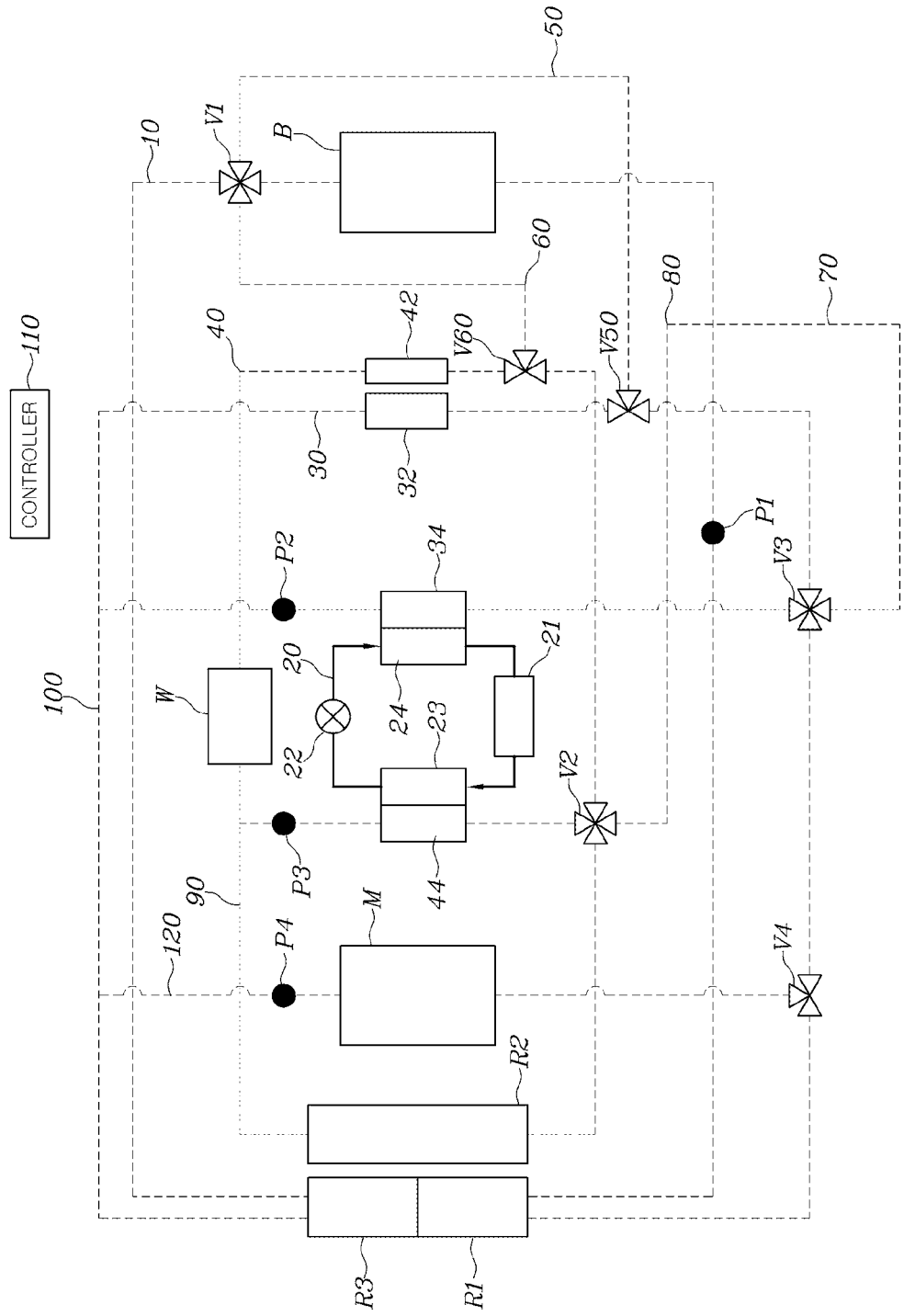
FIG. 1 is a view showing a thermal management system for a vehicle according to an exemplary embodiment of the present disclosure.

FIG. 1 is a view showing a thermal management system for a vehicle according to an exemplary embodiment of the present disclosure and FIGS. 2 to 12 are views showing flow the operation of a thermal management system for a vehicle according to an exemplary embodiment of the present disclosure and the flow of cooling water in each mode.

A controller 110 according to exemplary embodiments of the present disclosure can be a processor (e.g., computer, microprocessor, CPU, ASIC, circuitry, logic circuits etc.). The controller 110 may be implemented through a nonvolatile memory (not shown) configured to store, e.g., a program (s), software instructions reproducing algorithms, etc., which, when executed by the processor, controls operations of various components of a vehicle. The memory and the processor may be implemented as separate semiconductor circuits. Alternatively, the memory and the processor may be implemented as a single integrated semiconductor circuit. The processor may embody one or more processors. The controller 110 controls a first pump P1, a second pump P2, a third pump P3, and a fourth pump P4, thereby controlling the flow of cooling water in cooling water lines in which the pumps are respectively disposed. Further, the controller 110 controls the operation of a compressor 21 in a refrigerant line 20, thereby controlling the flow of a refrigerant in the refrigerant line 20. A first valve V1, a second valve V2, a third valve V3, a fourth valve V4, a cooling control valve V50, and a heating control valve V60 are controlled by the controller 110, thereby selectively connecting cooling water lines to which the valves are respectively connected, or controlling a flow rate. The valves are multi-way valves.

A thermal management system for a vehicle according to an exemplary embodiment of the present disclosure, as shown in FIG. 1, includes: a battery line 10 connecting a first radiator R1 and a high-voltage battery core B to each other for exchanging heat therebetween, having a first pump P1, and having cooling water flowing therethrough; a refrigerant line 20 having a compressor 21, an expansion valve 22, a condenser 23, and an evaporator 24 through which a refrigerant circulates; an interior cooling line 30 connecting an interior air-conditioning cooling core 32 to exchange heat with the evaporator 24 through a first heat exchanger 34, having a second pump P2, and having cooling water flowing therethrough; an interior heating line 40 connecting an interior air-conditioning heating core 42 to exchange heat with the condenser 23 through a second heat exchanger 44, having a third pump P3, and having cooling water flowing therethrough; a first battery cooling line 50 diverging from a downstream side of the cooling core 32 of the interior cooling line 30, connected to an upstream side of the high-voltage battery core B of the battery line 10, and having a cooling control valve V50 controlling whether to allow cooling water, which has passed through the cooling core 32, to flow into the high-voltage battery core B; and a first battery heating line 60 diverging from a downstream side of the heating core 42 of the interior heating line 40, connected to an upstream side of the high-voltage battery core B of the battery line 10, and having a heating control valve V60 controlling whether to allow cooling water, which has passed through the heating core 42, to flow into the high-voltage battery core B.

In more detail, in the battery line 10, the high-voltage battery core B is disposed, and the first radiator R1 for cooling the high-voltage battery core B using external air and the first pump P1 controlled to operate and stop by the controller 110 to circulate cooling water are disposed. The high-voltage battery core B may be a concept including both a heat dissipation unit directly connected with a high-voltage battery and a heat dissipation unit indirectly connected with a high-voltage battery through a separate cooling water line.

A refrigerant circulates through the refrigerant line 20 composed of the compressor 21, the expansion valve 22, the condenser 23, and the evaporator 24, whereby the refrigerant line 20 is thermally connected with other lines. The operation of the compressor 21 is controlled by the controller 110, and a refrigerant discharges and absorbs heat while circulating through the compressor 21, the condenser 23, the expansion valve 22, and the evaporator 24, thereby exchanging heat with other lines.

The refrigerant line 20 is thermally connected with the interior cooling line 30 and the interior heating line 40. The interior air-conditioning cooling core 32 and the second pump P2 controlled to operate and stop by the controller 110 to circulate cooling water are disposed in the interior cooling line 30. Further, the first heat exchanger 34 is disposed in the interior cooling line 30 and exchanges heat with the evaporator 24 in the refrigerant line 20, whereby the interior cooling line 30 and the refrigerant line 20 are thermally connected to each other. Further, air passing through the interior air-conditioning cooling core 32 is cooled, so cold air can be discharged to the interior of a vehicle.

The interior air-conditioning heating core 42 and the third pump P3 controlled to operate and stop by the controller 110 to circulate cooling water are disposed in the interior heating line 40. Further, the second heat exchanger 44 is disposed in the interior heating line 40 and exchanges heat with the condenser 23 in the refrigerant line 20, whereby the interior heating line 40 and the refrigerant line 20 are thermally connected to each other. Further, air passing through the interior air-conditioning heating core 42 is increased in temperature, so hot air can be discharged to the interior of a vehicle.

Figure 2:
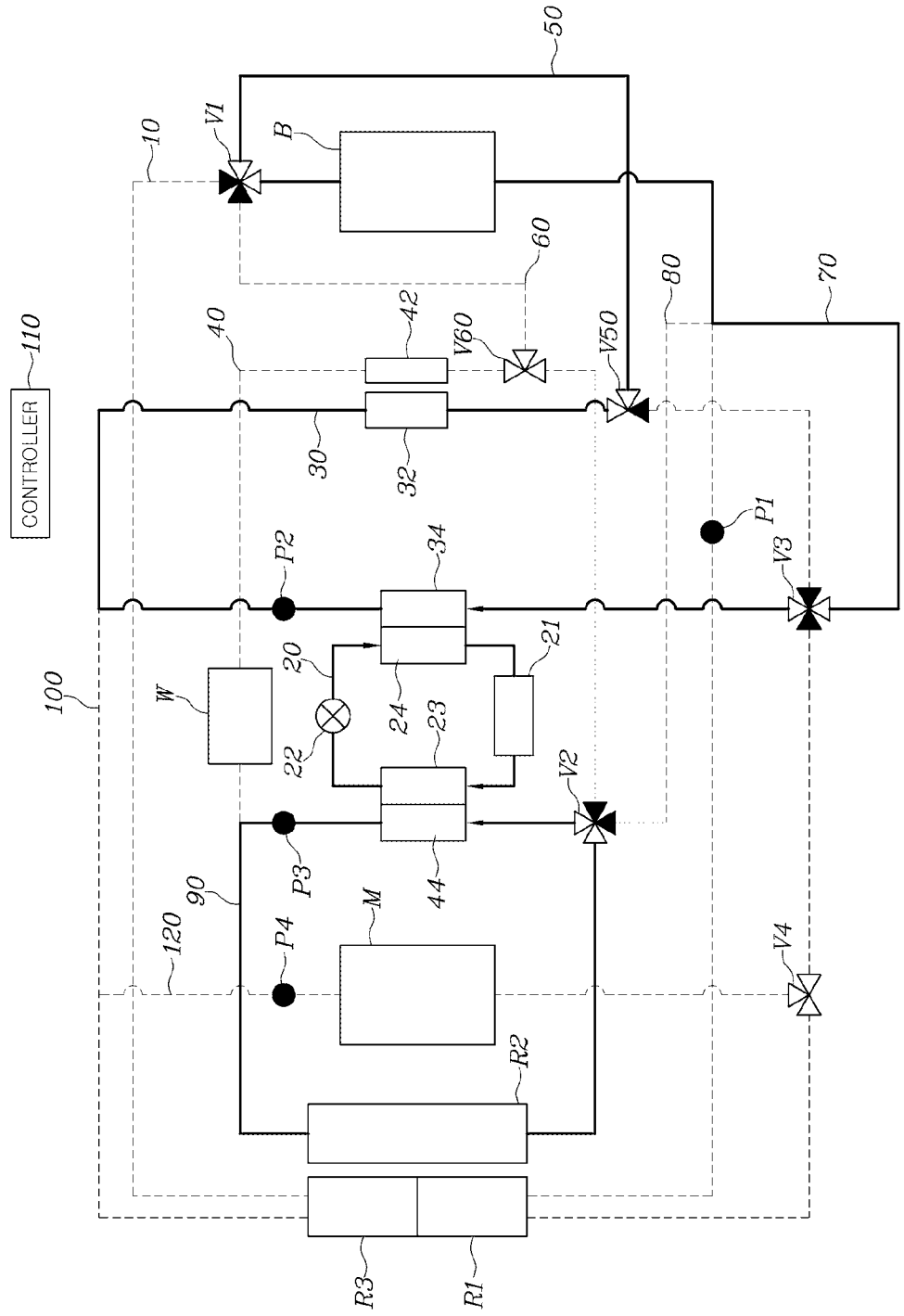
FIGS. 2 to 12 are views showing flow the operation of a thermal management system for a vehicle according to exemplary embodiments of the present disclosure and the flow of cooling water in each mode.

Further, the first battery cooling line 50 and the first battery heating line 60 are provided in the present disclosure. In detail, the first battery cooling line 50 diverges from a downstream side of the cooling core 32 of the interior cooling line 30 and connected to an upstream side of the high-voltage battery core B of the battery line 10. Accordingly, cooling water that has passed through the cooling core 32 of the interior cooling line 30, as shown in FIG. 2, can flow into the battery line 10 through the first battery cooling line 50. Therefore, cooling water that has passed through the cooling core 32 can flow into the high-voltage battery core B. Thermal management systems for a vehicle in the related art require a cooling water line and a refrigerant line for air-conditioning for cooling an interior and a separate cooling water line and refrigerant line for cooling a high-voltage battery. However, in the present disclosure, since the interior cooling line 30 and the battery line 10 are connected to each other through the first battery cooling line 50, there is the advantage that it is possible to perform air-conditioning for cooling an interior and cool a high-voltage battery core with only one refrigerant line. Accordingly, the use amount of a refrigerant is remarkably reduced, so there is an eco-friendly advantage too. The cooling control valve V50 controlled to selectively connect channels or control a flow rate by the controller 110 is disposed in the first battery cooling line 50. Whether to allow cooling water that has passed through the cooling core 32 to flow into the high-voltage battery core B can be controlled by controlling the cooling control valve V50.

Figure 4:
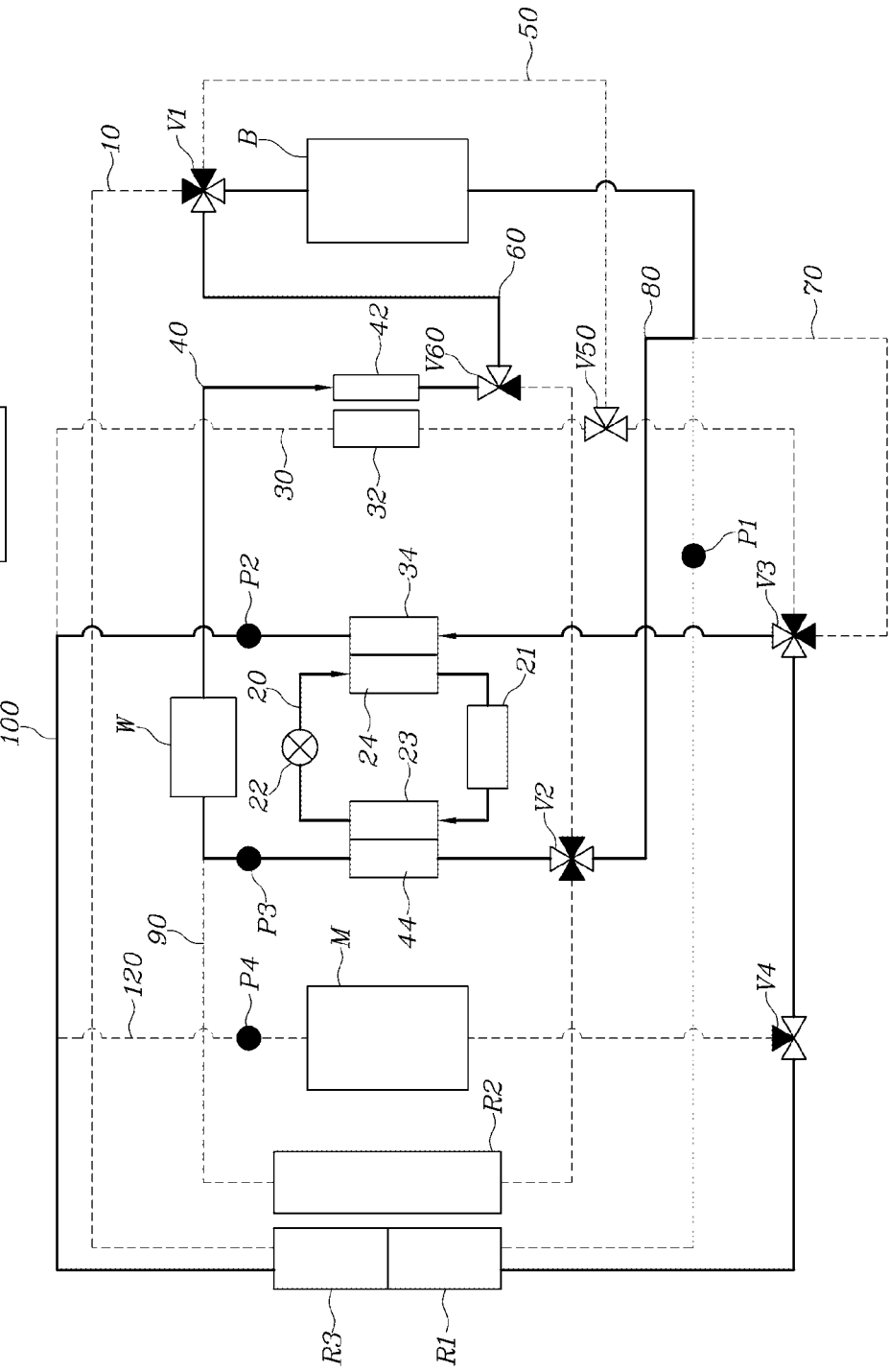

On the other hand, the first battery heating line 60 diverges from a downstream side of the heating core 42 of the interior cooling line 30 and connected to an upstream side of the high-voltage battery core B of the battery line 10. Accordingly, cooling water that has passed through the heating core 42 of the interior heating line 40, as shown in FIG. 4, can flow into the battery line 10 through the first battery cooling line 60. Therefore, cooling water that has passed through the heating core 42 can flow into the high-voltage battery core B. Thermal management systems for a vehicle in the related art require a cooling water line and a refrigerant line for air-conditioning for cooling an interior and a separate cooling water line and refrigerant line for increasing the temperature a high-voltage battery. In the present disclosure, since an interior heating line and a battery line are connected to each other through a first battery heating line, so there is the advantage that it is possible to perform air-conditioning for heating an interior and increase the temperature of a high-voltage battery core with only one refrigerant line. Accordingly, the use amount of a refrigerant is remarkably reduced, so there is an eco-friendly advantage too. The heating control valve V60 controlled to selectively connect channels or control a flow rate by the controller 110 is disposed in the first battery heating line 60. Whether to allow cooling water that has passed through the heating core 42 to flow into the high-voltage battery core B can be controlled by controlling the heating control valve V60.

On the other hand, the present disclosure, as shown in FIG. 1, further includes: a second battery cooling line 70 and a second battery heating line 80 respectively diverging from a downstream side of the high-voltage battery core B of the battery line 10 and connected to an upstream side of the first heat exchanger 34 of the interior cooling line 30 and an upstream side of the second heat exchanger 44 of the interior heating line 40. The first battery cooling line 50 and the first battery heating line 60 may be connected to the battery line 10 through the first valve V1. The second battery cooling line 70 diverges from a downstream side of the high-voltage battery core B of the battery line 10 and is connected to an upstream side of the first heat exchanger 34 of the interior cooling line 30. Accordingly, as shown in FIG. 2, cooling water flowing into the high-voltage battery core B through the first battery cooling line 50 flows into the first heat exchanger 34 through the second battery cooling line 70 after passing through the high-voltage battery core B. The second battery heating line 80 diverges from a downstream side of the high-voltage battery core B of the battery line 10 and is connected to an upstream side of the second heat exchanger 44 of the interior heating line 40. Accordingly, as shown in FIG. 4, cooling water flowing into the high-voltage battery core B through the first battery heating line 60 flows into the second heat exchanger 44 through the second battery heating line 80 after passing through the high-voltage battery core B.

Further, the first battery cooling line 50 and the first battery heating line 60 may be connected to the battery line 10 through the first valve V1. The first valve V1 is controlled by the controller 110, thereby selectively connecting channels or controlling a flow rate. Accordingly, the flow of cooling water through the battery line 10, the first battery cooling line 50, and the first battery heating line 60 is controlled by the first valve V1.

The present disclosure, as shown in FIG. 1, further includes a second radiator line 90 connecting the second radiator R2 and the second heat exchanger 44 for heat exchange and having one end connected to an upstream side of the second heat exchanger 44 of the interior heating line 40 and the other end connected to a downstream side of the second heat exchanger 44 of the interior heating line 40. The second radiator line 90 and the second battery heating line 80 may be connected to the interior heating line 40 through the second valve V2.

In detail, the second radiator R2 is disposed in the second radiator line 90. The second radiator R2 makes external air outside a vehicle and cooling water passing through the second radiator R2 exchange heat with each other. The second radiator line 90 is connected to an upstream side and a downstream side of the second heat exchanger 44 of the interior heating line 40 at one end and the other end, respectively. The second radiator line 90 and the second battery heating line 80 may be connected to the interior heating line 40 through the second valve V2. The second valve V2 is controlled by the controller 110, thereby selectively connecting channels or controlling a flow rate. Accordingly, the flow of cooling water through the interior heating line 40, the second radiator line 90, and the second battery heating line 80 is controlled by the second valve V2.

As shown in FIGS. 1 and 2, in a first mode that cools the high-voltage battery core B and discharges cooled air to the interior of a vehicle, the controller 110 can circulate the refrigerant in the refrigerant line 20 by operating the compressor 21, circulate cooling water by controlling the third pump P3 and the second valve V2 such that the second radiator R2 and the second heat exchanger 44 exchange heat with each other, and control the cooling water that has passed through the cooling core 32 to flow into the high-voltage battery core B and then flow into the first heat exchanger 34 by controlling the second pump P2, the cooling control valve V50, and the first valve V1.

In detail, the controller 110 circulates a refrigerant through the refrigerant line 20 by operating the compressor 21. Further, the controller 110 controls the third pump P3 and the second valve V2 such that cooling water circulates through a portion of the interior heating line 40 and the second radiator line 90. Accordingly, the second heat exchanger 44 in the interior heating line 40 and the condenser 23 in the refrigerant line 20 are thermally connected to each other through heat exchange, and the cooling water increased in temperature through the second heat exchanger 44 is cooled by exchanging heat with external air through the second radiator R2 and then circulates back to the second heat exchanger 44. Further, the controller 110 controls the second pump P2, the cooling control valve V50, and the first valve V1 such that cooling water circulates through a portion of the interior cooling line 30, the first battery cooling line 50, a portion of the battery line 10, and the second battery cooling line 70. Accordingly, the first heat exchanger 34 in the interior cooling line 30 and the evaporator 24 in the refrigerant line 20 are thermally connected to each other through heat exchange, and the cooling water cooled through the first heat exchanger 34 flows into the high-voltage battery core B through the cooling core 32. The cooling water that has passed through the high-voltage battery core B circulates to the first heat exchanger 34 through the second battery cooling line 70. In this case, the air passing through the interior air-conditioning cooling core 32 is cooled, so cooled air can be discharged to the interior of a vehicle. Further, cooled cooling air is supplied to the high-voltage battery core B, thereby being able to cool the high-voltage battery core B.

Figure 3:
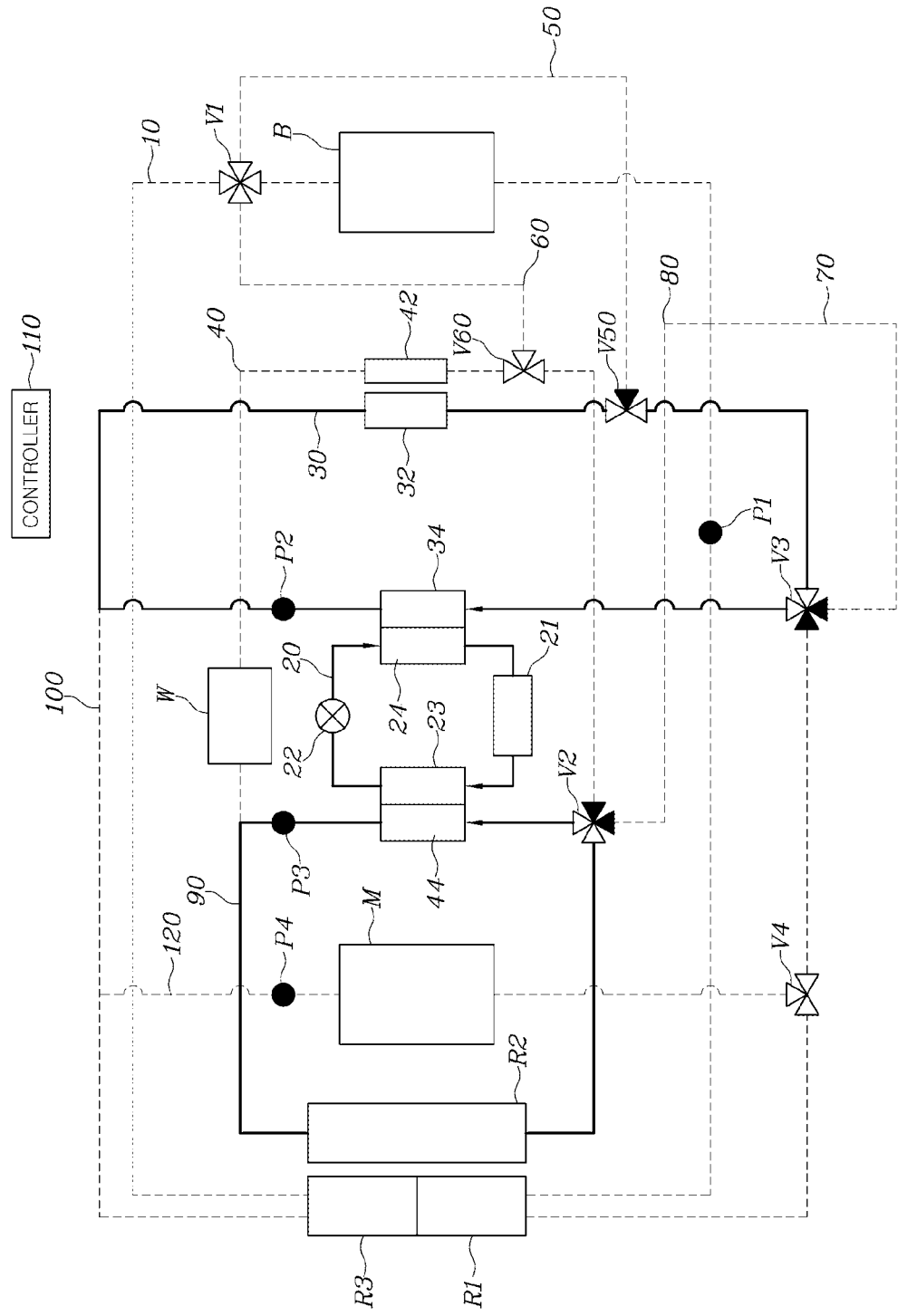

As shown in FIGS. 1 and 3, according to the present disclosure, in a second mode that discharges cooled air to the interior of a vehicle, the controller 110 can circulate the refrigerant in the refrigerant line 20 by operating the compressor 21, circulate cooling water by controlling the third pump P3 and the second valve V2 such that the second radiator R2 and the second heat exchanger 44 exchange heat with each other, and control the cooling water that has passed through the cooling core 32 to flow into the first heat exchanger 34 by controlling the second pump P2 and the cooling control valve V50.

In detail, the controller 110 circulates a refrigerant through the refrigerant line 20 by operating the compressor 21. Further, the controller 110 controls the third pump P3 and the second valve V2 such that cooling water circulates through a portion of the interior heating line 40 and the second radiator line 90. Accordingly, the second heat exchanger 44 in the interior heating line 40 and the condenser 23 in the refrigerant line 20 are thermally connected with each other through heat exchange, and the cooling water increased in temperature through the second heat exchanger 44 is cooled by exchanging heat with external air through the second radiator R2 and then circulates back to the second heat exchanger 44.

Further, the controller 110 controls the second pump P2 and the cooling control valve V50 such that cooling water circulates through the interior cooling line 30. Accordingly, the first heat exchanger 34 in the interior cooling line 30 and the evaporator 24 in the refrigerant line 20 are thermally connected to each other through heat exchange, and the cooling water cooled through the first heat exchanger 34 passes through the cooling core 32 and then circulates back to the first heat exchanger 34. In this case, air passing through the interior air-conditioning cooling core 32 is cooled, so cooled air can be discharged to the interior of a vehicle.

The present disclosure, as shown in FIG. 1, further includes a third radiator line 100 connecting a third radiator R3 and the first heat exchanger 34 for heat exchange and having one end connected to an upstream side of the first heat exchanger 34 of the interior cooling line 30 and the other end connected to a downstream side of the first heat exchanger 34 of the interior cooling line 30. The third radiator line 100 and the second battery cooling line 70 may be connected to the interior cooling line 30 through the third valve V3.

In detail, the third radiator R3 is disposed in the third radiator line 100. The third radiator R3 makes external air outside a vehicle and cooling water passing through the third radiator R3 exchange heat. The third radiator line 100 is connected to an upstream side and a downstream side of the first heat exchanger 34 of the interior cooling line 30 at one end and the other end, respectively. The end, the third radiator line 100 and the second battery heating line 80 may be connected to the interior cooling line 30 through the third valve V3. The third valve V3 is controlled by the controller 110, thereby selectively connecting channels or controlling a flow rate. Accordingly, the flow of cooling water through the interior cooling line 30, the third radiator line 100, and the second battery cooling line 70 is controlled by the third valve V3.

As shown in FIGS. 1 and 4, according to the present disclosure, in a third mode that increases the temperature of the high-voltage battery core B and discharges air with increased temperature to the interior of a vehicle, the controller 110 can circulate the refrigerant in the refrigerant line 20 by operating the compressor 21, circulate cooling water by controlling the second pump P2 and the third valve V3 such that the third radiator R3 and the first heat exchanger 34 exchange heat with each other, and control the cooling water that has passed through the heating core 42 to flow into the high-voltage battery core B and then flow into the second heat exchanger 44 by controlling the third pump P3, the heating control valve V60, the first valve V1, and the second valve V2.

In detail, the controller 110 circulates a refrigerant through the refrigerant line 20 by operating the compressor 21. Further, the controller 110 controls the second pump P2 and the third valve V3 such that cooling water circulates through a portion of the interior cooling line 30 and the third radiator line 100. Accordingly, the first heat exchanger 34 in the interior cooling line 30 and the evaporator 24 in the refrigerant line 20 are thermally connected with each other through heat exchange, and the cooling water cooled through the first heat exchanger 34 is increased in temperature by exchanging heat with external air through the third radiator R3 and then circulates back to the first heat exchanger 34. Further, the controller 110 controls the third pump P3, the heating control valve V60, the first valve V1, and the second valve V2 such that cooling water circulates through a portion of the interior heating line 40, the first battery heating line 60, a portion of the battery line 10, and the second battery heating line 80. Accordingly, the second heat exchanger 44 in the interior heating line 40 and the condenser 23 in the refrigerant line 20 are thermally connected to each other through heat exchange, and the cooling water increased in temperature through the second heat exchanger 44 flows into the high-voltage battery core B through the heating core 42. The cooling water that has passed through the high-voltage battery core B circulates to the second heat exchanger 44 through the second battery heating line 80. In this case, the air passing through the interior air-conditioning heating core 42 is increased in temperature, so air with increased temperature can be discharged to the interior of a vehicle. Further, cooling air with increased temperature is supplied to the high-voltage battery core B, thereby being able to increase the temperature of the high-voltage battery core B.

Figure 5:
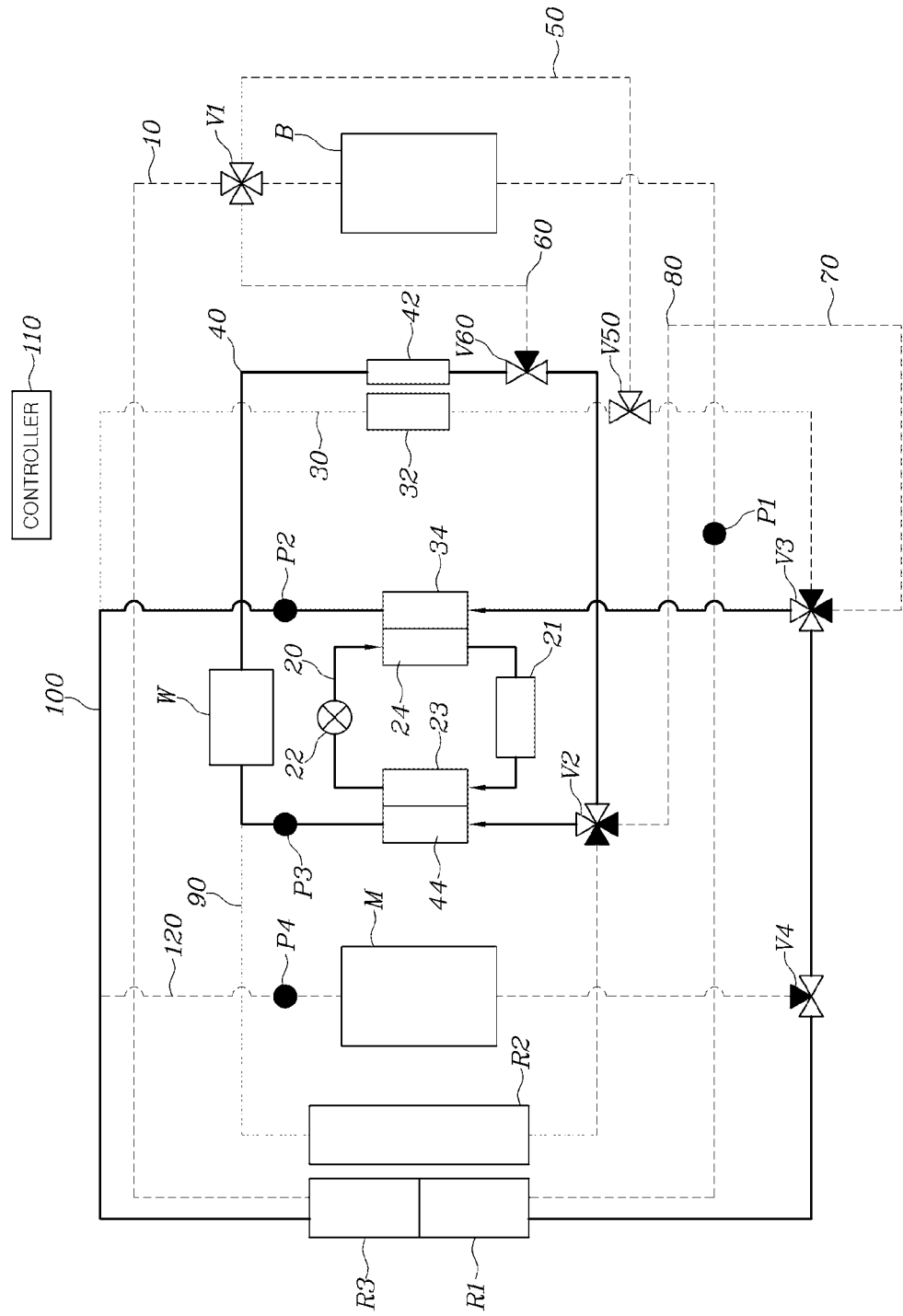

As shown in FIGS. 1 and 5, according to the present disclosure, in a fourth mode that discharges air with increased temperature to the interior of a vehicle, the controller 110 can circulate the refrigerant in the refrigerant line 20 by operating the compressor 21, circulate cooling water by controlling the second pump P2 and the third valve V3 such that the third radiator R3 and the second heat exchanger 44 exchange heat with each other, and control the cooling water that has passed through the heating core 42 to flow into the second heat exchanger 44 by controlling the third pump P3, the heating control valve V60, and the second valve V2.

In detail, the controller 110 circulates a refrigerant through the refrigerant line 20 by operating the compressor 21. Further, the controller 110 controls the second pump P2 and the third valve V3 such that cooling water circulates through a portion of the interior cooling line 30 and the third radiator line 100. Accordingly, the first heat exchanger 34 in the interior cooling line 30 and the evaporator 24 in the refrigerant line 20 are thermally connected with each other through heat exchange, and the cooling water cooled through the first heat exchanger 34 is increased in temperature by exchanging heat with external air through the third radiator R3 and then circulates back to the first heat exchanger 34. Further, the controller 110 controls the third pump P3 and the heating control valve V60 such that cooling water circulates through the interior heating line 40. Accordingly, the second heat exchanger 44 in the interior heating line 40 and the condenser 23 in the refrigerant line 20 are thermally connected to each other through heat exchange, and the cooling water increased in temperature through the second heat exchanger 44 passes through the heating core 42 and then circulates back to the second heat exchanger 44. In this case, air passing through the interior air-conditioning heating core 42 is increased in temperature, so air with increased temperature can be discharged to the interior of a vehicle.

The present disclosure, as shown in FIG. 1, further includes an electric device line 120 connected with an electric device core M, having one end connected to an upstream side of the third radiator R3 of the third radiator line 100, having the other end connected to a downstream side of the third radiator R3 of the third radiator line 100 through a fourth valve V4, having a fourth pump P4, and having cooling water flowing therethrough.

A vehicle is equipped with electric devices such as an ECU, an OBC, and a motor. These electric devices generate when the vehicle is driven. Accordingly, the electric device core M may be a concept including both a heat dissipation unit directly connected with an electric device and a heat dissipation unit indirectly connected with an electric device through a separate cooling water line.

In detail, the electric device line 120 is connected with the electric device core M. Further, the electric device line 120 has one end connected to an upstream side of the third radiator R3 of the third radiator line 100 and the other end connected to a downstream side of the third radiator R3 of the third radiator line 100 through the fourth valve V4. The fourth valve V4 is controlled by the controller 110, thereby selectively connecting channels or controlling a flow rate. Accordingly, the flow of cooling water through the third radiator line 100 and the electric device line 120 is controlled by the fourth valve V4. Further, the fourth pump P4 controller to operate and stop by the controller 110 to circulate cooling water is disposed in the electric device line 120.

Figure 6:
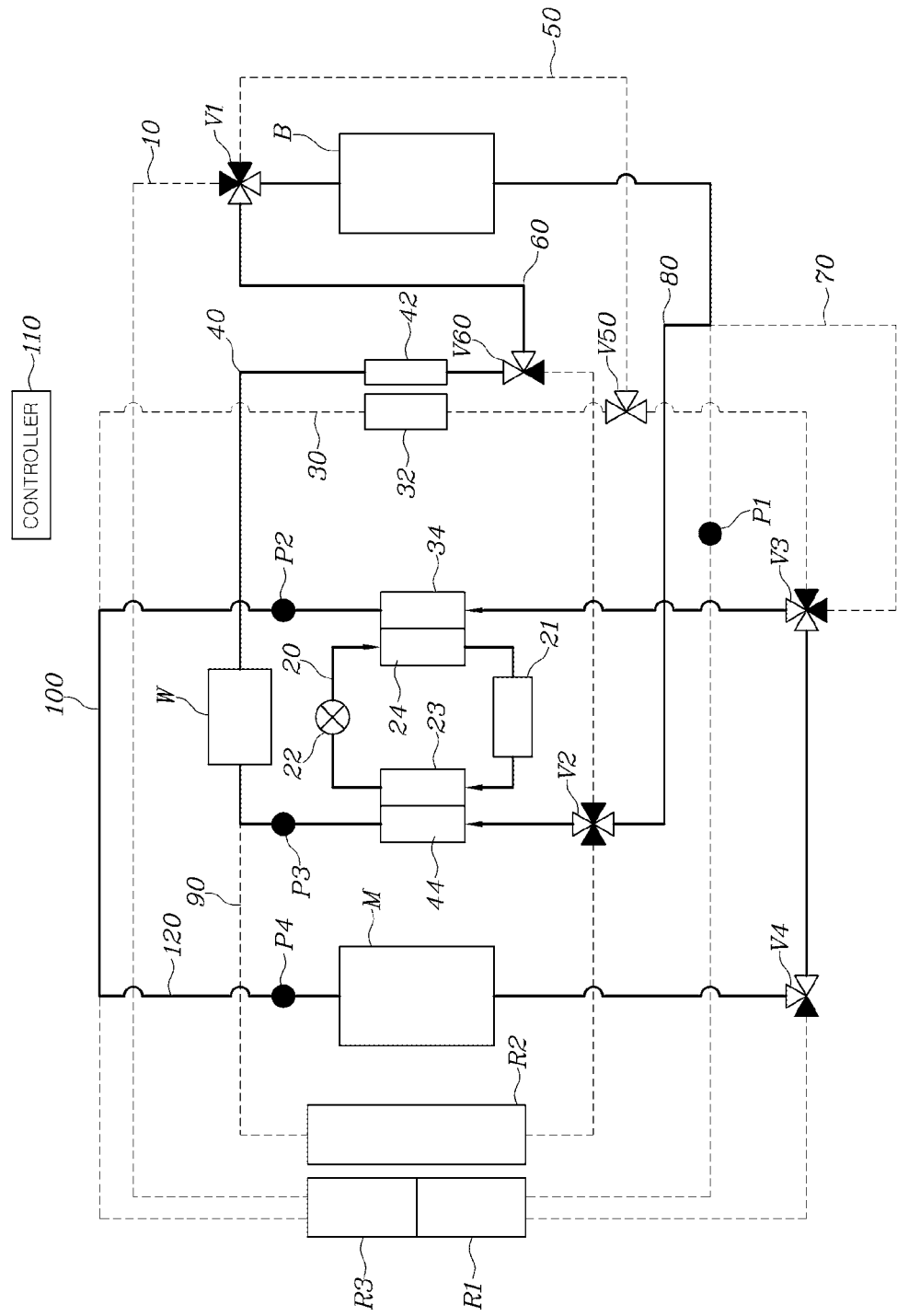

As shown in FIGS. 1 and 6, according to the thermal management system for a vehicle of the present disclosure, in a fifth mode that recovers waste heat of the electric device core M, increases the temperature of the high-voltage battery core B, and discharges air with increased temperature to the interior of a vehicle, the controller 110 can circulate the refrigerant in the refrigerant line 20 by operating the compressor 21, circulate cooling water by controlling the second pump P2, the third valve V3, and the fourth valve V4 such that the electric device core M and the first heat exchanger 34 exchange heat with each other, and control the cooling water that has passed through the heating core 42 to flow into the high-voltage battery core B and then flow into the second heat exchanger 44 by controlling the third pump P3, the heating control valve V60, the first valve V1, and the second valve V2.

In detail, the controller 110 circulates a refrigerant through the refrigerant line 20 by operating the compressor 21. Further, the controller 110 controls the second pump P2, the third valve V3, and the fourth valve V4 such that cooling water circulates through a portion of the interior cooling line 30, a portion of the third radiator line 100, and the electric device line 120. Accordingly, the first heat exchanger 34 in the interior cooling line 30 and the evaporator 24 in the refrigerant line 20 are thermally connected to each other through heat exchange, and the cooling water cooled through the first heat exchanger 34 is increased in temperature by heat exchange through the electric device core M and then circulates back to the first heat exchanger 34. Further, the controller 110 controls the third pump P3, the heating control valve V60, the first valve V1, and the second valve V2 such that cooling water circulates through a portion of the interior heating line 40, the first battery heating line 60, a portion of the battery line 10, and the second battery heating line 80. Accordingly, the second heat exchanger 44 in the interior heating line 40 and the condenser 23 in the refrigerant line 20 are thermally connected to each other through heat exchange, and the cooling water increased in temperature through the second heat exchanger 44 flows into the high-voltage battery core B through the heating core 42. The cooling water that has passed through the high-voltage battery core B circulates to the second heat exchanger 44 through the second battery heating line 80. In this case, the air passing through the interior air-conditioning heating core 42 is increased in temperature, so air with increased temperature can be discharged to the interior of a vehicle. Further, cooling air with increased temperature is supplied to the high-voltage battery core B, thereby being able to increase the temperature of the high-voltage battery core B. Since the waste heat of the electric device core M is recovered and used for heating and increasing the temperature of the high-voltage battery core in the fifth mode, there is the advantage that the thermal efficiency of the thermal management system for a vehicle is increased.

Figure 7:
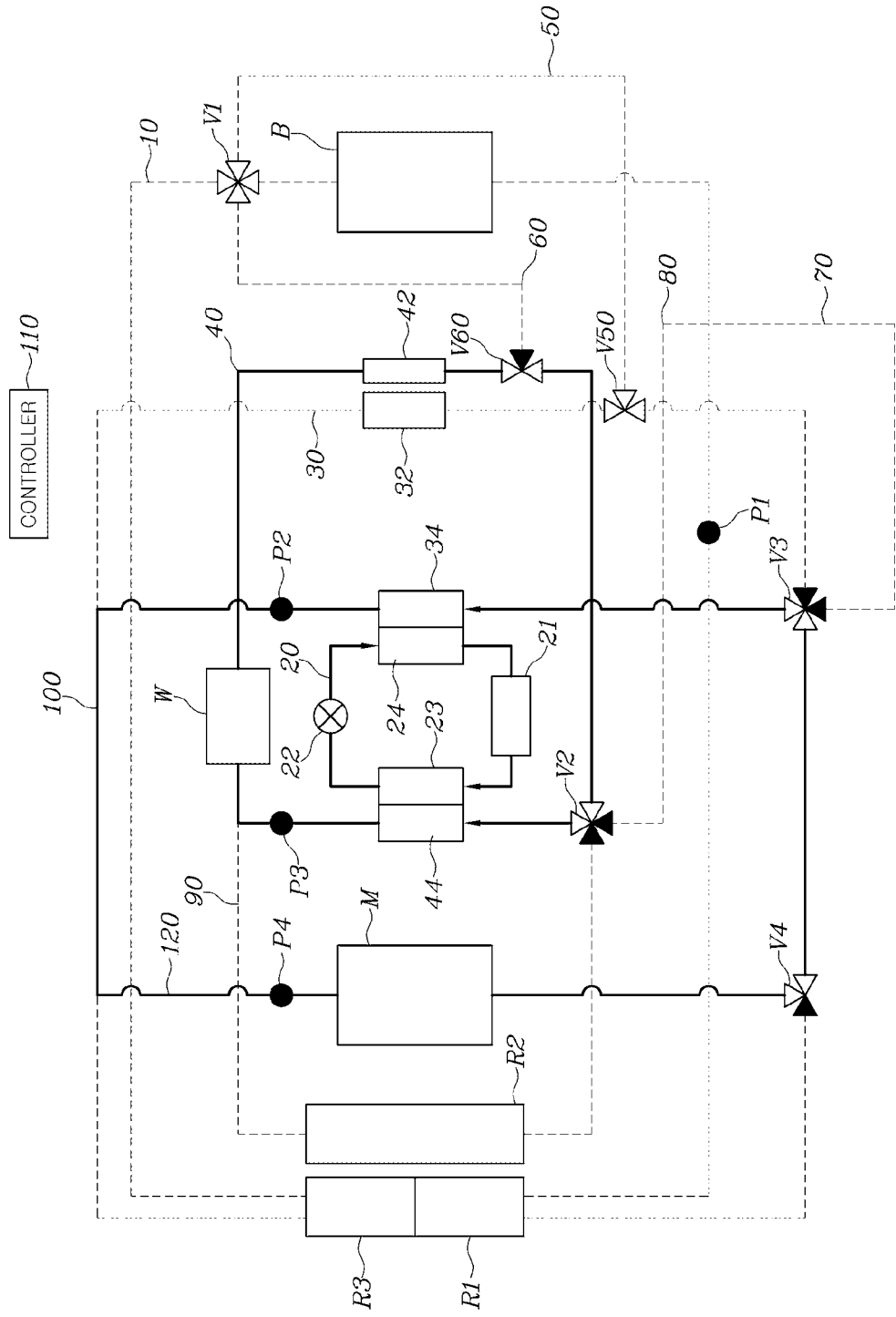

As shown in FIGS. 1 and 7, according to the thermal management system for a vehicle of the present disclosure, in a sixth mode that recovers waste heat of the electric device core M and discharges air with increased temperature to the interior of a vehicle, the controller 110 can circulate the refrigerant in the refrigerant line 20 by operating the compressor 21, circulate cooling water by controlling the fourth pump P4, the third valve V3, and the fourth valve V4 such that the electric device core M and the first heat exchanger 34 exchange heat with each other, and control the cooling water that has passed through the heating core 42 to flow into the second heat exchanger 44 by controlling the third pump P3, the heating control valve V60, and the second valve V2.

In detail, the controller 110 circulates a refrigerant through the refrigerant line 20 by operating the compressor 21. Further, the controller 110 controls the fourth pump P4, the third valve V3, and the fourth valve V4 such that cooling water circulates through a portion of the interior cooling line 30, a portion of the third radiator line 100, and the electric device line 120. Accordingly, the first heat exchanger 34 in the interior cooling line 30 and the evaporator 24 in the refrigerant line 20 are thermally connected to each other through heat exchange, and the cooling water cooled through the first heat exchanger 34 is increased in temperature by heat exchange through the electric device core M and then circulates back to the first heat exchanger 34. Further, the controller 110 controls the third pump P3, the heating control valve V60, and the second valve V2 such that cooling water circulates through the interior heating line 40. Accordingly, the second heat exchanger 44 in the interior heating line 40 and the condenser 23 in the refrigerant line 20 are thermally connected to each other through heat exchange, and the cooling water increased in temperature through the second heat exchanger 44 passes through the heating core 42 and then circulates back to the second heat exchanger 44. In this case, air passing through the interior air-conditioning heating core 42 is increased in temperature, so air with increased temperature can be discharged to the interior of a vehicle. Since the waste heat of the electric device core M is recovered and used for heating in the sixth mode, there is the advantage that the thermal efficiency of the thermal management system for a vehicle is increased.

Figure 8:
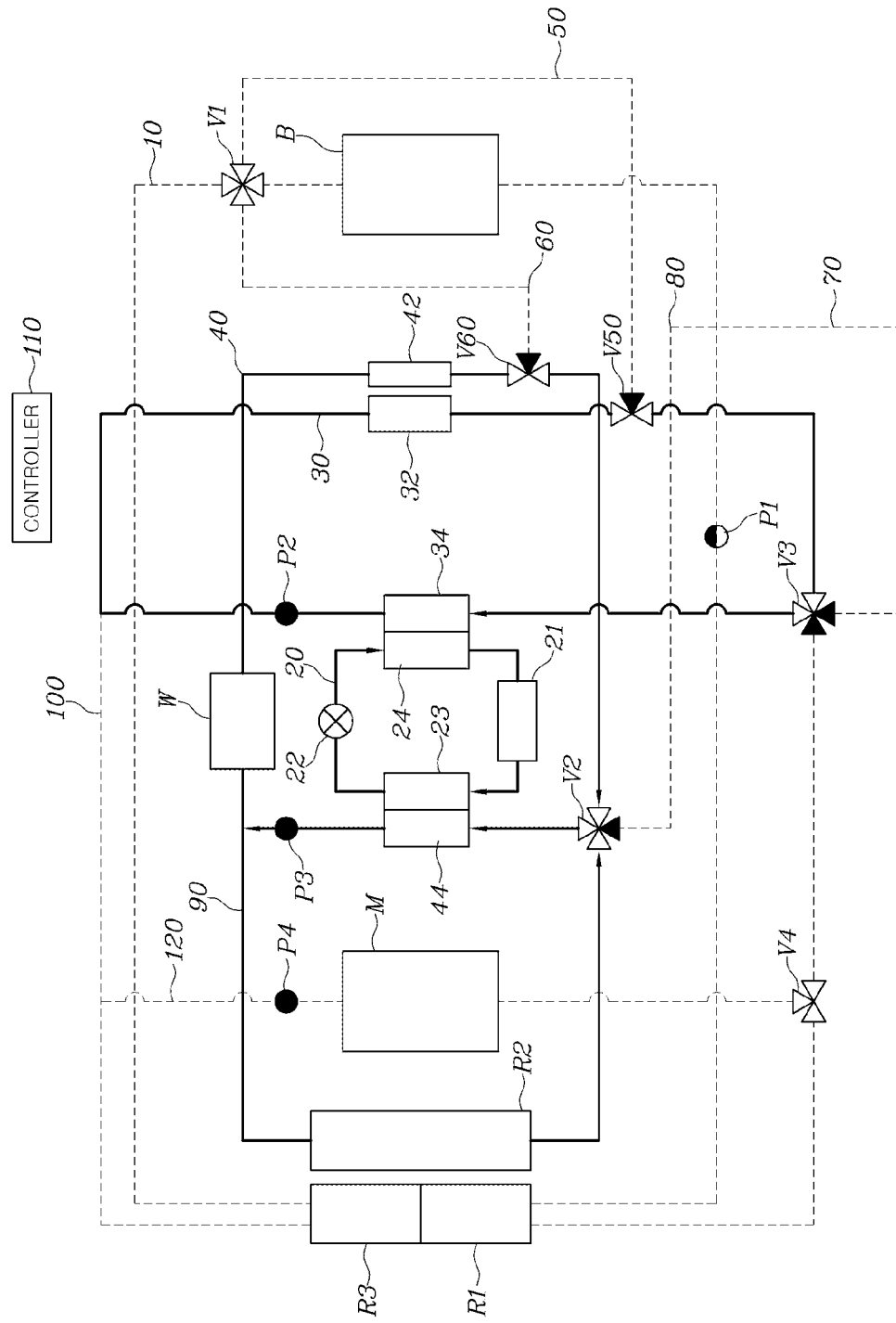

As shown in FIGS. 1 and 8, according to the thermal management system for a vehicle of the present disclosure, in a seventh mode that discharged dehumidified air to the interior of a vehicle, the controller 110 can circulate the refrigerant in the refrigerant line 20 by operating the compressor 21, circulate cooling water such that the cooling water that has passed through the second heat exchanger 44 to diverge and separately flow into the heating core 42 and the second radiator R2 by controlling the third pump P3, the heating control valve V60, and the second valve V2, and control the cooling water that has passed through the cooling core 32 to flow into the second heat exchanger 44 by controlling the second pump P2, the cooling control valve V50, and the third valve V3.

In detail, the controller 110 circulates a refrigerant through the refrigerant line 20 by operating the compressor 21. Further, the controller 110 controls the third pump P3, the heating control valve V60, and the second valve V2 such that cooling water circulates through the interior heating line 40 and the second radiator line 90. As shown in FIG. 8, as the third pump P3 is operated, the cooling water that has passed through the second heat exchanger 44 diverges and separately circulates through the heating core 42 and the second radiator R2, and then circulates back to the second heat exchanger 44 through the second valve V2. Accordingly, the second heat exchanger 44 in the interior heating line 40 and the condenser 23 in the refrigerant line 20 are thermally connected with each other through heat exchange, and the cooling water increased in temperature through the second heat exchanger 44 is cooled by heat exchange through the second radiator R2 and the heating core 42 and then circulates back to the second heat exchanger 44. Further, the controller 110 controls the second pump P2, the cooling control valve V50, and the third valve V3 such that cooling water circulates through the interior cooling line 30. Accordingly, the first heat exchanger 34 in the interior cooling line 30 and the evaporator 24 in the refrigerant line 20 are thermally connected to each other through heat exchange, and the cooling water cooled through the first heat exchanger 34 passes through the cooling core 32 and then circulates back to the first heat exchanger 34. In this case, the air passing through the interior air-conditioning cooling core 32 is cooled and dehumidified and is then increased in temperature while passing through the interior air-conditioning heating core 42. Accordingly, dehumidified air can be discharged to the interior of a vehicle.

Figure 9:
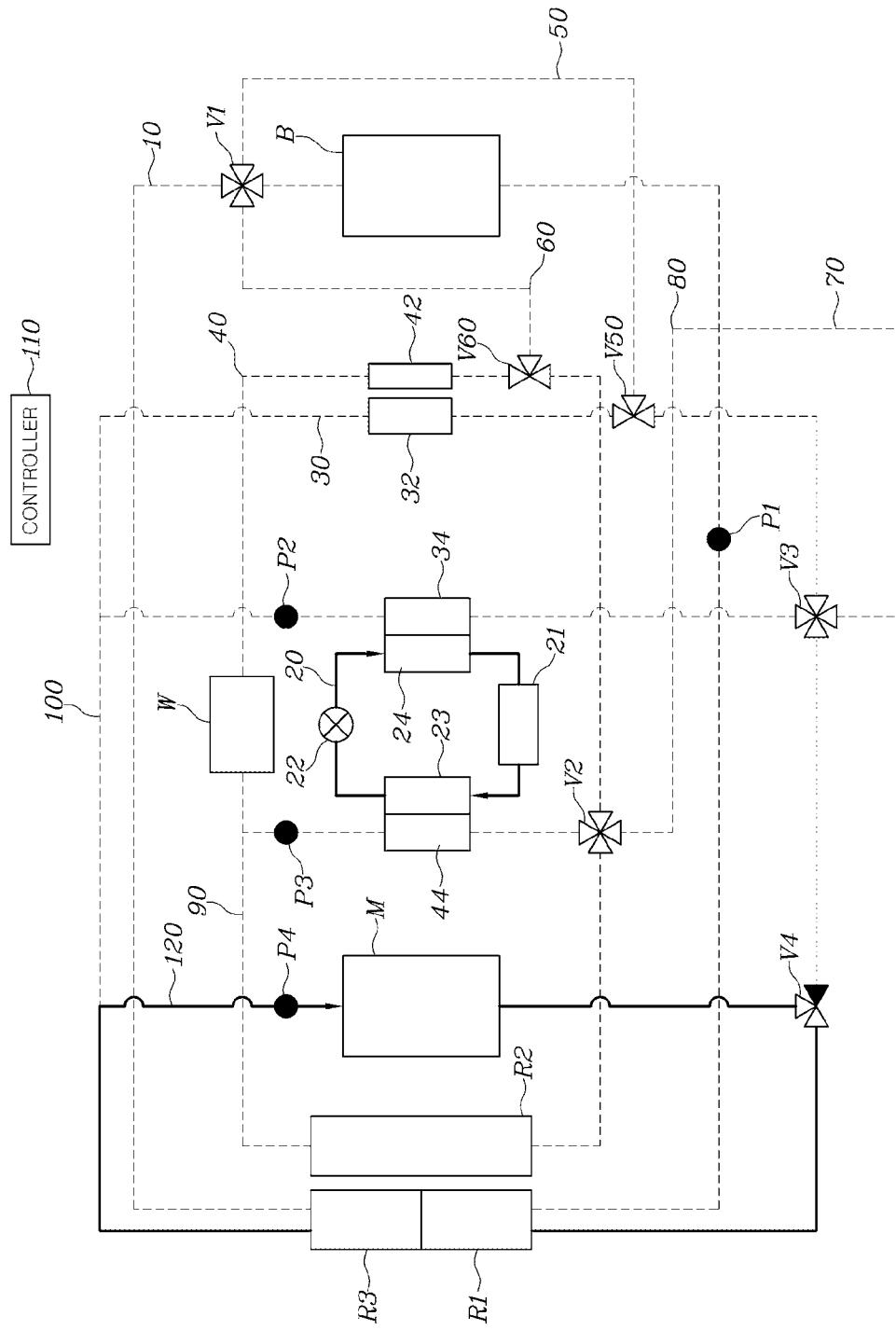

As shown in FIGS. 1 and 9, according to the thermal management system for a vehicle of the present disclosure, in an eighth mode that cools the electric device core M using the third radiator R3, the controller 110 can control the cooling water that has passed through the electric device core M to flow into the third radiator R3 by controlling the fourth pump P4 and the fourth valve V4.

In detail, the controller 110 controls the fourth pump P4 and the fourth valve V4 such that cooling water circulates through the electric device line 120 and a portion of the third radiator line 100. Accordingly, the cooling water increases in temperature by recovering the waste heat of the electric device core M while passing through the electric device core M of the electric device line 120. That is, the electric device core M is cooled. Further, the cooling water that has passed through the electric device core M discharges heat through the third radiator R3, so it is cooled again. Since the fourth pump P4 is used in the eighth mode, cooling water can flow through the third radiator R3 in the opposite direction to the third mode and the fourth mode that use the second pump.

Figure 10:
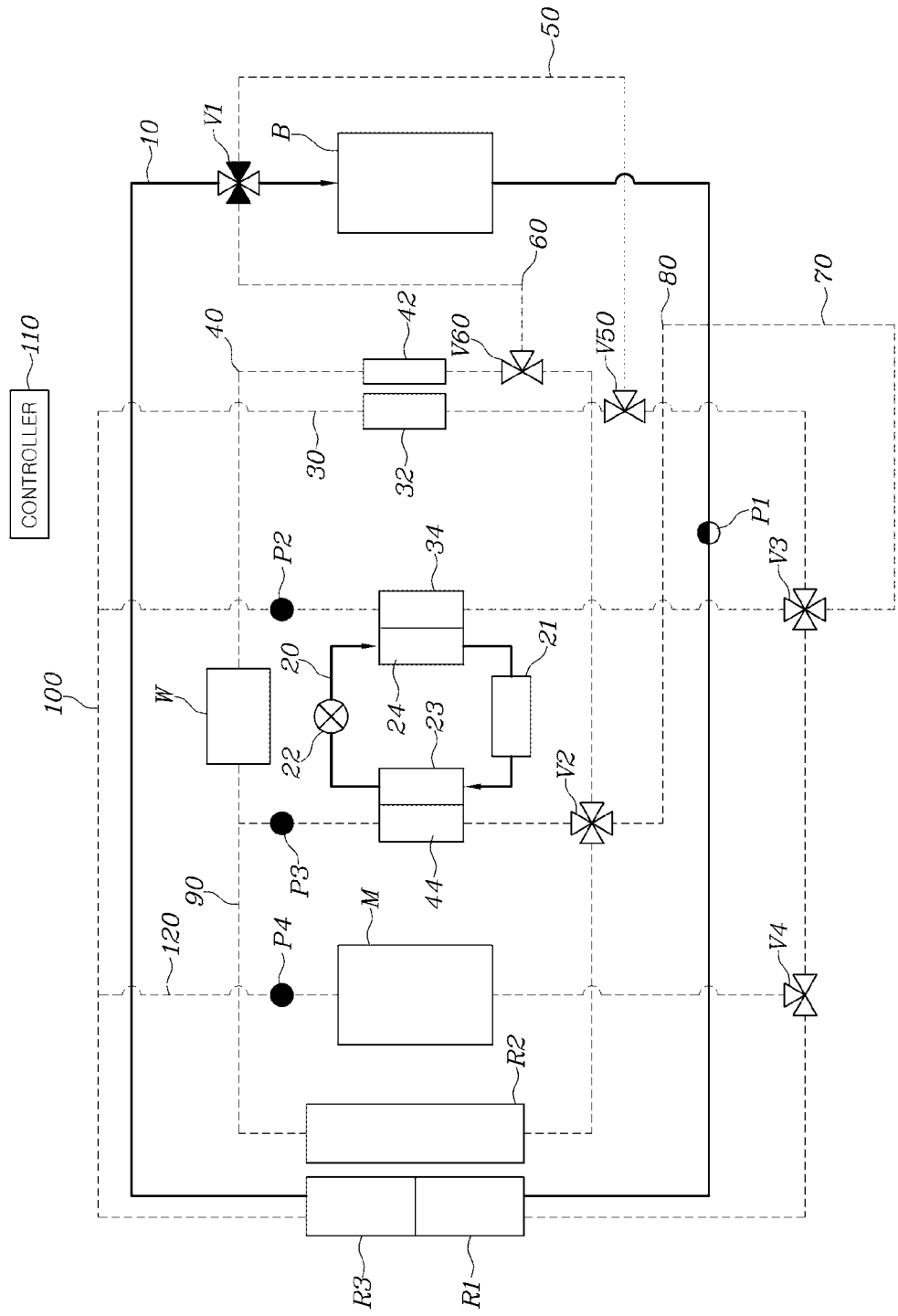
Figure 11:
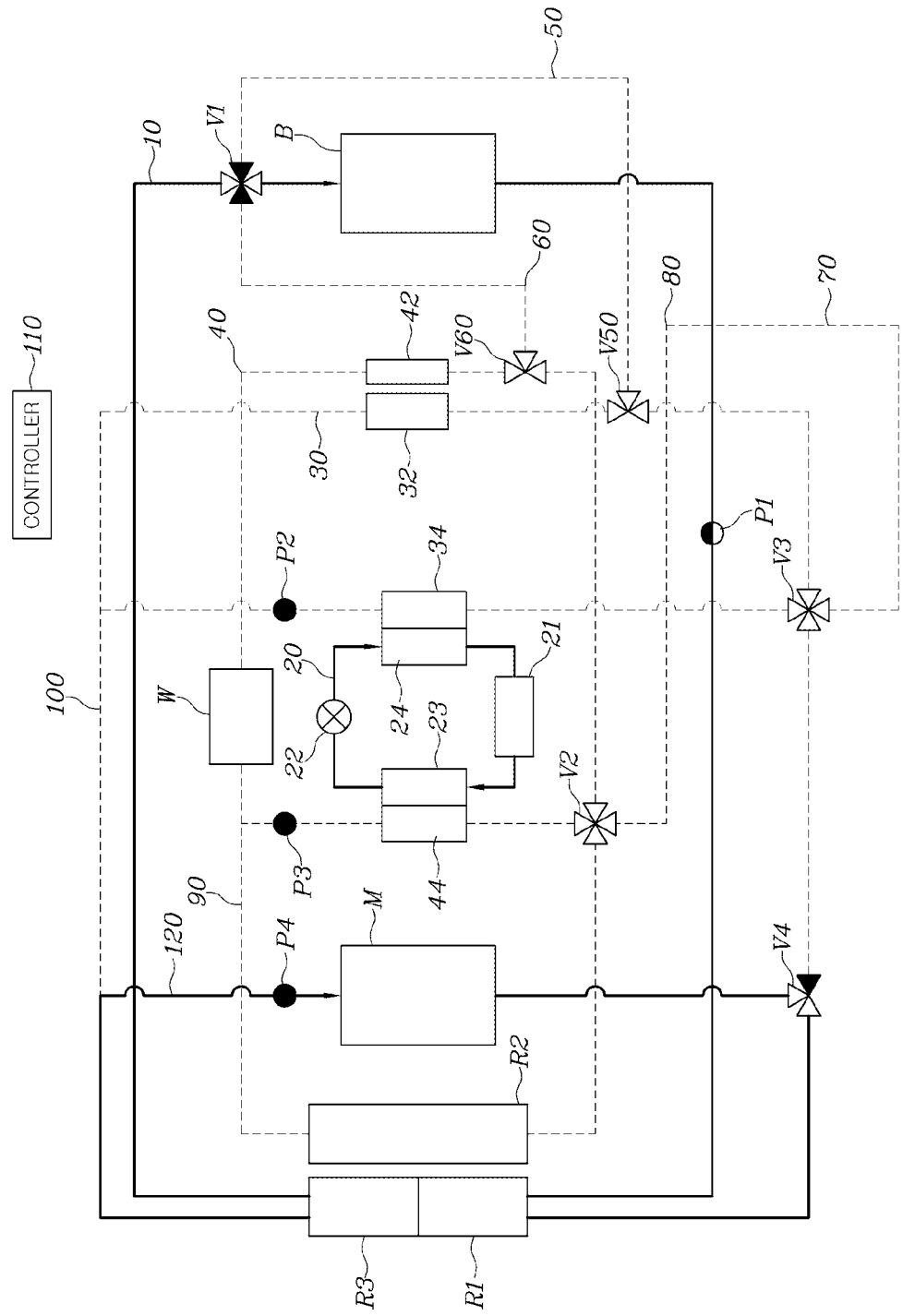

As shown in FIGS. 1 and 10, according to the thermal management system for a vehicle of the present disclosure, in a ninth mode that cools the high-voltage battery core B using the first radiator R1, the controller 110 can control the cooling water that has passed through the high-voltage battery core B to flow into the first radiator R1 by controlling the first pump P1 and the first valve V1.

In detail, the controller 110 circulates cooling water through the battery line 10 by controlling the first pump P1 and the first valve V1. The cooling water that has increased in temperature through the high-voltage battery core B is cooled by exchanging heat with external air through the first radiator R1. That is, the high-voltage battery core B is cooled. Further, the cooling water that has passed through the high-voltage battery core B discharges heat through the first radiator R1, so it is cooled again.

Figure 12:
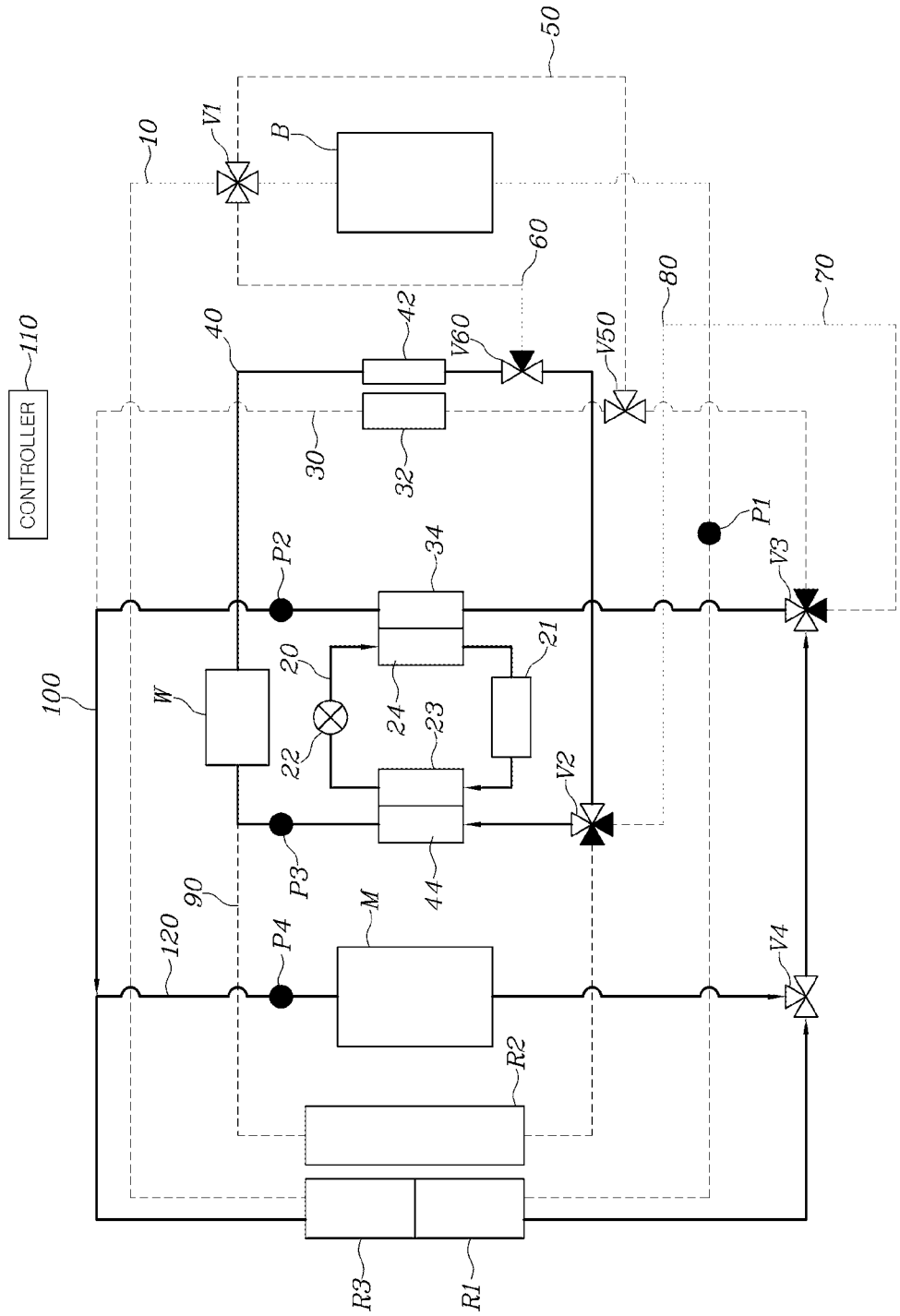

As shown in FIGS. 1 and 12, according to the thermal management system for a vehicle of the present disclosure, in a tenth mode that cools the high-voltage battery core B using the first radiator R1 and cools the electric device core M using the third radiator R3, the controller 110 can control the cooling water that has passed through the high-voltage battery core B to flow into the first radiator R1 by controlling the first pump P1 and the first valve V2, and control the cooling water that has passed through the electric device core M to flow into the third radiator R3 by controlling the fourth pump P4 and the fourth valve V4.

In detail, the controller 110 circulates cooling water through the battery line 10 by controlling the first pump P1 and the first valve V1. The cooling water that has increased in temperature through the high-voltage battery core B is cooled by exchanging heat with external air through the first radiator R1. That is, the electric device core M is cooled. Further, the cooling water that has passed through the electric device core M discharges heat through the third radiator R3, so it is cooled again. Further, the controller 110 controls the fourth pump P4 and the fourth valve V4 such that cooling water circulates through a portion of the third radiator line 100 and the electric device line 120. Accordingly, the cooling water that has increased in temperature through the electric device core M is cooled by exchanging heat with external air through the third radiator R3. That is, the high-voltage battery core B is cooled. Further, the cooling water that has passed through the high-voltage battery core B discharges heat through the first radiator R1, so it is cooled again. Since the fourth pump P4 is used in the tenth mode, cooling water can flow through the third radiator R3 in the opposite direction to the third mode and the fourth mode that use the second pump.

As shown in FIGS. 1 and 12, according to the thermal management system for a vehicle of the present disclosure, in an eleventh mode that cools the electric device core M using the third radiator R3 and discharges air with increased temperature to the interior of a vehicle, the controller 110 can circulate the refrigerant in the refrigerant line 20 by operating the compressor 21, control the cooling water that has passed through the second heat exchanger 44 to diverge and separately flow into the third radiator R3 and the electric device core M by controlling the second pump P2, the third valve V3, and the fourth valve V4, and control the cooling water that has passed through the heating core 42 to flow into the second heat exchanger 44 by controlling the third pump P3, the heating control valve V60, and the second valve V2.

In detail, the controller 110 circulates a refrigerant through the refrigerant line 20 by operating the compressor 21. Further, the controller 110 controls the second pump P2, the third valve V3, and the fourth valve V4 such that the cooling water that has passed through the second heat exchanger 44 to diverge and separately flow into the third radiator line 100 and the electric device core M. Accordingly, the first heat exchanger 34 in the interior cooling line 30 and the evaporator 24 in the refrigerant line 20 are thermally connected with each other through heat exchange, and the cooling water cooled through the first heat exchanger 34 is increased in temperature by heat exchange through the third radiator R3 and the electric device core M and then circulates back to the first heat exchanger 34. Further, the controller 110 controls the third pump P3, the heating control valve V60, and the second valve V2 such that cooling water that has passed through the heating core 42 flows into the second heat exchanger 44. Accordingly, the second heat exchanger 44 in the interior heating line 40 and the condenser 23 in the refrigerant line 20 are thermally connected to each other through heat exchange, and the cooling water increased in temperature through the second heat exchanger 44 passes through the heating core 42, passes through the high-voltage battery core B, and then circulates back to the second heat exchanger 44. In this case, air passing through the interior air-conditioning heating core 42 is increased in temperature, so hot air is discharged to the interior of a vehicle. Further, the cooling water that has passed through the interior air-conditioning heating core 42 flows into the high-voltage battery core B, thereby increasing the temperature of the high-voltage battery core B.

Further, as shown in FIGS. 1 and 12, a cooling water heater W that heats cooling water may be separately disposed in the interior heating line 40. Further, though not specifically shown in the figures, it may be possible to supply cooling water by disposing a reservoir tank, which supplies cooling water, in each of the lines.

According to the thermal management system for a vehicle of the present disclosure, it is possible to efficiently manage energy required for interior air-conditioning and cooling/heating of a battery in the automotive thermal management field.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A thermal management system for a vehicle, the thermal management system comprising:
   a battery line, through which cooling water flows, having a first pump and connecting a first radiator and a battery core to each other for exchanging heat therebetween;
   a refrigerant line, through which a refrigerant circulates, having a compressor, an expansion valve, a condenser, and an evaporator;
   an interior cooling line, through which cooling water flows, having a second pump and connecting an interior air-conditioning cooling core with a first heat exchanger to exchange heat with the evaporator;
   an interior heating line, through which cooling water flows, having a third pump and connecting an interior air-conditioning heating core with a second heat exchanger to exchange heat with the condenser;
   a first battery cooling line diverging from a downstream side of the cooling core of the interior cooling line, connected to an upstream side of the battery core of the battery line, and having a cooling control valve controlling whether to allow cooling water, which has passed through the cooling core, to flow into the battery core;
   a first battery heating line diverging from a downstream side of the heating core of the interior heating line, connected to an upstream side of the battery core of the battery line, and having a heating control valve controlling whether to allow cooling water, which has passed through the heating core, to flow into the battery core;
   a second battery cooling line;
   a second battery heating line; and
   a first valve,
   wherein the second battery cooling line and the second battery heating line are respectively diverging from a downstream side of the battery core of the battery line,
   wherein the second battery cooling line is connected to an upstream side of the first heat exchanger of the interior cooling line,
   wherein the second battery heating line is connected to an upstream side of the second heat exchanger of the interior heating line, and
   wherein the first battery cooling line and the first battery heating line are connected to the battery line through the first valve.

2. The thermal management system of claim 1, further comprising:
   a second radiator line connecting the second radiator and the second heat exchanger to each other for exchanging heat therebetween; and
   a second valve,
   wherein one end of the second radiator line is connected to an upstream side of the second heat exchanger of the interior heating line,
   wherein another end of the second radiator line is connected to a downstream side of the second heat exchanger of the interior heating line, and
   wherein the second radiator line and the second battery heating line are connected to the interior heating line through the second valve.

3. The thermal management system of claim 2, further comprising a controller, wherein, in a first mode that cools the battery core and discharges cooled air to an interior of a vehicle, the controller is configured to:
   circulate the refrigerant in the refrigerant line by operating the compressor,
   circulate cooling water by controlling the third pump and the second valve such that the second radiator and the second heat exchanger exchange heat with each other, and
   control the cooling water that has passed through the cooling core to flow into the battery core and then flow into the first heat exchanger by controlling the second pump, the cooling control valve, and the first valve.

4. The thermal management system of claim 2, further comprising a controller, wherein, in a second mode that discharges cooled air to an interior of a vehicle, the controller is configured to:
circulate the refrigerant in the refrigerant line by operating the compressor,
circulate cooling water by controlling the third pump and the second valve such that the second radiator and the second heat exchanger exchange heat with each other, and
control the cooling water that has passed through the cooling core to flow into the first heat exchanger by controlling the second pump and the cooling control valve.

5. The thermal management system of claim 2, further comprising:
a third radiator line connecting a third radiator and the first heat exchanger for heat exchange; and
a third valve,
wherein one end of the third radiator line is connected to an upstream side of the first heat exchanger of the interior cooling line,
wherein another end of the third radiator is connected to a downstream side of the first heat exchanger of the interior cooling line,
wherein the third radiator line and the second battery cooling line are connected to the interior cooling line through the third valve.

6. The thermal management system of claim 5, further comprising a controller, wherein, in a third mode that increases the temperature of the battery core and discharges air with increased temperature to an interior of a vehicle, the controller is configured to:
circulate the refrigerant in the refrigerant line by operating the compressor,
circulate cooling water by controlling the second pump and the third valve such that the third radiator and the first heat exchanger exchange heat with each other, and
control the cooling water that has passed through the heating core to flow into the battery core and then flow into the second heat exchanger by controlling the third pump, the heating control valve, the first valve, and the second valve.

7. The thermal management system of claim 5, further comprising a controller, wherein, in a fourth mode that discharges air with increased temperature to an interior of a vehicle, the controller is configured to:
circulate the refrigerant in the refrigerant line by operating the compressor,
circulate cooling water by controlling the second pump and the third valve such that the third radiator and the second heat exchanger exchange heat with each other, and
control the cooling water that has passed through the heating core to flow into the second heat exchanger by controlling the third pump, the heating control valve, and the second valve.

8. The thermal management system of claim 5, further comprising:
an electric device line connected with an electric device core; and
a fourth valve,
wherein the electric device line has one end connected to an upstream side of the third radiator of the third radiator line and another end connected to a downstream side of the third radiator of the third radiator line through the fourth valve, and
wherein the electric device line has a fourth pump through which cooling water flows.

9. The thermal management system of claim 8, further comprising a controller, wherein, in a fifth mode that recovers waste heat of the electric device core, increases the temperature of the battery core, and discharges air with increased temperature to an interior of a vehicle, the controller is configured to:
circulate the refrigerant in the refrigerant line by operating the compressor,
circulate cooling water by controlling the second pump, the third valve, and the fourth valve such that the electric device core and the first heat exchanger exchange heat with each other, and
control the cooling water that has passed through the heating core to flow into the battery core and then flow into the second heat exchanger by controlling the third pump, the heating control valve, the first valve, and the second valve.

10. The thermal management system of claim 8, further comprising a controller, wherein, in a sixth mode that recovers waste heat of the electric device core and discharges air with increased temperature to an interior of a vehicle, the controller is configured to:
circulate the refrigerant in the refrigerant line by operating the compressor,
circulate cooling water by controlling the fourth pump, the third valve, and the fourth valve such that the electric device core and the first heat exchanger exchange heat with each other, and
control the cooling water that has passed through the heating core to flow into the second heat exchanger by controlling the third pump, the heating control valve, and the second valve.

11. The thermal management system of claim 8, further comprising a controller, wherein, in a seventh mode that discharged dehumidified air to an interior of a vehicle, the controller is configured to:
circulate the refrigerant in the refrigerant line by operating the compressor,
circulate cooling water such that the cooling water that has passed through the second heat exchanger to diverge and separately flow into the heating core and the second radiator by controlling the third pump, the heating control valve, and the second valve, and
control the cooling water that has passed through the cooling core to flow into the second heat exchanger by controlling the second pump, the cooling control valve, and the third valve.

12. The thermal management system of claim 8, further comprising a controller, wherein, in an eighth mode that cools the electric device core using the third radiator, the controller is configured to control the cooling water that has passed through the electric device core to flow into the third radiator by controlling the fourth pump and the fourth valve.

13. The thermal management system of claim 8, further comprising a controller, wherein, in a ninth mode that cools the battery core using the first radiator, the controller is configured to control the cooling water that has passed through the battery core to flow into the first radiator by controlling the first pump and the first valve.

14. The thermal management system of claim 8, further comprising a controller, wherein, in a tenth mode that cools the battery core using the first radiator and cools the electric device core using the third radiator, the controller is configured to:
- control the cooling water that has passed through the battery core to flow into the first radiator by controlling the first pump and the first valve, and
- control the cooling water that has passed through the electric device core to flow into the third radiator by controlling the fourth pump and the fourth valve.

15. The thermal management system of claim 8, further comprising a controller, wherein, in an eleventh mode that cools the electric device core using the third radiator and discharges air with increased temperature to an interior of a vehicle, the controller is configured to:
- circulate the refrigerant in the refrigerant line by operating the compressor,
- control the cooling water that has passed through the second heat exchanger to diverge and separately flow into the third radiator and the electric device core by controlling the second pump, the third valve, and the fourth valve, and
- control the cooling water that has passed through the heating core to flow into the second heat exchanger by controlling the third pump, the heating control valve, and the second valve.

* * * * *